US012668293B2

(12) United States Patent
    Zehfuss

(10) Patent No.:    US 12,668,293 B2
(45) Date of Patent:        Jun. 30, 2026

(54) WAGON WITH FOLDING CANOPY FOR CARRYING CHILDREN

(71) Applicant: Dynamic Motion, LLC, Richmond, VA (US)

(72) Inventor: Mark Zehfuss, Glen Allen, VA (US)

(73) Assignee: Dynamic Motion, LLC, Richmond, VA (US)

( * ) Notice: Subject to any disclaimer, the term of this patent is extended or adjusted under 35 U.S.C. 154(b) by 207 days.

(21) Appl. No.: 18/516,267

(22) Filed: Nov. 21, 2023

(65) Prior Publication Data

US 2025/0162639 A1      May 22, 2025

(51) Int. Cl.
     *B62B 9/14*        (2006.01)
     *B62B 3/02*        (2006.01)
     *B62B 7/00*        (2006.01)
     *B62B 7/08*        (2006.01)
     *E04H 15/06*       (2006.01)
     *E04H 15/36*       (2006.01)

(52) U.S. Cl.
     CPC .............. *B62B 9/142* (2013.01); *B62B 7/008* (2013.01); *B62B 7/08* (2013.01); *E04H 15/06* (2013.01); *E04H 15/36* (2013.01); *Y10S 135/906* (2013.01)

(58) Field of Classification Search
     CPC .......... B62B 7/08; B62B 7/008; B62B 9/142; B62B 5/0013; E04H 15/06; E04H 15/36
     USPC ...................................... 135/88.03, 124, 132
     See application file for complete search history.

(56) References Cited

U.S. PATENT DOCUMENTS

| | | | | | |
|---|---|---|---|---|---|
| 471,484 | A | * | 3/1892 | Leonhardt .......... | B62D 33/0625 |
| | | | | | 296/102 |
| 1,124,153 | A | * | 1/1915 | Lloyd ........................ | B62B 7/08 |
| | | | | | 280/39 |
| 1,195,316 | A | * | 8/1916 | Womack .................. | B60J 7/064 |
| | | | | | 296/109 |
| 2,391,658 | A | * | 12/1945 | Thornhill .................. | B62B 9/18 |
| | | | | | 280/47.11 |
| 2,493,833 | A | * | 1/1950 | Reynolds ................ | B63B 17/02 |
| | | | | | 114/361 |
| 4,635,667 | A | * | 1/1987 | Harn ........................ | E04H 15/58 |
| | | | | | 135/90 |
| 4,834,415 | A | * | 5/1989 | Yee ............................ | B62B 7/08 |
| | | | | | 280/658 |
| 4,886,289 | A | * | 12/1989 | Yee ............................ | B62B 7/08 |
| | | | | | 280/47.35 |

(Continued)

FOREIGN PATENT DOCUMENTS

| | | | | | |
|---|---|---|---|---|---|
| CA | 3172196 | A1 * | 9/2021 | ............... | B62B 7/08 |
| WO | WO-2021188636 | A1 * | 9/2021 | ............. | B62B 7/008 |
| WO | WO-2025111416 | A1 * | 5/2025 | ............. | B62B 9/142 |

OTHER PUBLICATIONS 10 page PDF of the written opinion mailed Mar. 19, 2025 in PCT/US2024/046811. (Year: 2025).*

*Primary Examiner* — Robert Canfield
(74) *Attorney, Agent, or Firm* — Bernard G. Pike; Pike IP Law, PLLC

(57)                    ABSTRACT

A wagon for carrying children or other articles comprising a canopy. The wagon has a canopy to provide shade and protection to the occupants and/or other contents of the wagon and the canopy may be folded from an in-use configuration to a storage configuration. If the wagon is a foldable wagon, the canopy may remain on the wagon during and after the folding of the wagon.

13 Claims, 9 Drawing Sheets

(56) References Cited

U.S. PATENT DOCUMENTS

| | | | | | |
|---|---|---|---|---|---|
| 4,978,166 | A | * | 12/1990 | James | A47D 15/00 |
| | | | | | 297/400 |
| 5,333,893 | A | * | 8/1994 | Chen | B62B 7/08 |
| | | | | | 108/177 |
| 5,769,448 | A | * | 6/1998 | Wang | B62B 7/08 |
| | | | | | 280/658 |
| 6,076,206 | A | * | 6/2000 | Celaya | A47C 29/003 |
| | | | | | 5/113 |
| 6,454,340 | B1 | * | 9/2002 | Miller | B60J 7/10 |
| | | | | | 296/105 |
| 6,764,133 | B2 | * | 7/2004 | Osato | A47D 1/08 |
| | | | | | 297/184.13 |
| 6,789,495 | B2 | * | 9/2004 | Brower | B63B 17/02 |
| | | | | | 114/361 |
| D551,724 | S | * | 9/2007 | Seckel | D21/536 |
| D555,748 | S | * | 11/2007 | Gyr | D21/837 |
| 8,328,208 | B2 | * | 12/2012 | Chen | B60N 2/2848 |
| | | | | | 280/47.38 |
| 8,388,015 | B2 | * | 3/2013 | Chen | B62B 3/02 |
| | | | | | 280/642 |
| 8,602,441 | B2 | * | 12/2013 | Li | B62B 7/08 |
| | | | | | 280/658 |
| 9,205,855 | B2 | * | 12/2015 | Gower | B62B 7/044 |
| D774,993 | S | * | 12/2016 | Zehfuss | D12/129 |
| 9,586,640 | B1 | * | 3/2017 | Scott | B62J 17/08 |
| 9,962,011 | B1 | * | 5/2018 | Eyman | B62B 9/12 |
| 10,286,940 | B2 | * | 5/2019 | Chen | B62B 7/08 |
| 10,787,188 | B2 | * | 9/2020 | Popp | B62B 7/064 |
| 11,052,933 | B2 | * | 7/2021 | Cheng | B62B 7/10 |
| 11,053,706 | B2 | * | 7/2021 | Knapp | B60H 1/3226 |
| 11,465,665 | B2 | * | 10/2022 | Sturgeon | B62B 7/062 |
| 11,498,601 | B2 | * | 11/2022 | Zehfuss | B62B 7/008 |
| 11,772,698 | B2 | * | 10/2023 | Cui | B62B 7/08 |
| | | | | | 280/650 |
| 12,037,037 | B2 | * | 7/2024 | Zehfuss | B62B 3/007 |
| 12,139,924 | B1 | * | 11/2024 | Beam | E04H 15/36 |
| 12,304,547 | B2 | * | 5/2025 | Kuang | B62B 7/062 |
| 12,371,090 | B2 | * | 7/2025 | Flessa | B62B 9/102 |
| 2010/0038886 | A1 | * | 2/2010 | Greger | B62B 7/123 |
| | | | | | 280/642 |
| 2013/0076009 | A1 | * | 3/2013 | Tsai | B62B 7/064 |
| | | | | | 280/647 |
| 2013/0264787 | A1 | * | 10/2013 | Cheng | B62B 7/008 |
| | | | | | 280/47.38 |
| 2014/0312586 | A1 | * | 10/2014 | Cheng | B62B 9/28 |
| | | | | | 280/47.35 |
| 2016/0001804 | A1 | * | 1/2016 | Pacella | B62B 9/02 |
| | | | | | 280/47.35 |
| 2018/0022371 | A1 | * | 1/2018 | Jakubowski | B62B 5/0013 |
| | | | | | 280/641 |
| 2020/0331510 | A1 | * | 10/2020 | Kim | B62B 7/142 |
| 2020/0405063 | A1 | * | 12/2020 | Bulger | A47C 13/00 |
| 2021/0107551 | A1 | * | 4/2021 | Sturgeon | B62B 7/062 |
| 2021/0269078 | A1 | * | 9/2021 | Chappell | A01K 1/0035 |
| 2021/0291886 | A1 | * | 9/2021 | Zehfuss | B62B 3/007 |
| 2021/0332605 | A1 | * | 10/2021 | Knapp | B60P 3/38 |
| 2022/0055676 | A1 | * | 2/2022 | Cui | B62B 9/12 |
| 2022/0135107 | A1 | * | 5/2022 | Sun | B62B 9/14 |
| | | | | | 297/184.13 |
| 2022/0410959 | A1 | * | 12/2022 | Flessa | B62B 9/104 |
| 2023/0057769 | A1 | * | 2/2023 | Zehfuss | B62B 9/108 |
| 2023/0150563 | A1 | * | 5/2023 | Grodkiewicz | B62B 5/087 |
| | | | | | 280/642 |
| 2025/0171068 | A1 | * | 5/2025 | Sun | B62B 9/14 |
| 2025/0256754 | A1 | * | 8/2025 | Ercanbrack | B62B 9/142 |

* cited by examiner

WAGON WITH FOLDING CANOPY FOR CARRYING CHILDREN

FIELD OF THE INVENTION

Wagons are configured for carrying children and/or other articles. Such wagons may be capable of being folded from an expanded in-use configuration for carrying small children and/or other articles to a compact storage configuration for the storage or transport of the wagon when it is not in-use and unfolded from the storage or transport configuration to the in-use configuration.

The wagon may comprise a canopy. The canopy may also be capable of being folded from an expanded in-use configuration for covering the child seating or cargo area to a storage configuration for the storage or transport of the wagon when it is not in-use and unfolded from the storage or transport configuration to the in-use configuration. With the canopy in the storage configuration, the wagon may be folded from the in-use configuration to the storage configuration without removing the canopy.

Additionally, the foldable wagon may comprise a wagon assembly and a canopy assembly. The wagon assembly may comprise a wagon frame and a fabric cover supported over the frame to define the wagon walls, floor, cargo area, and other structure.

BACKGROUND

Wagons have a cargo area or bed that may be used to carry articles, groceries, children, and other supplies, for example. Typically, a wagon comprises a wagon bed defined by a fabric cover having a floor and side panels, at least one handle, and four wheels. Other wagons may have solid walls made from plastic or wood, for example. Some conventional wagons may be folded from an open in-use configuration to a collapsed storage configuration.

A folding wagon is described in U.S. Pat. No. 5,957,482 filed Aug. 30, 1996, for example. The wagon may be folded from a flat position for use to a position which the two bed halves are in face-to-face contact for storage. Furthermore, the removable rail modules may be removable for storage.

The foldable wagons may comprise canopies, however, the canopies may have to be removed prior to folding the wagon from the in-use configuration to the storage configuration. There is a need for a folding wagon comprising at least one canopy that comprises an in-use configuration and a storage configuration.

SUMMARY OF THE INVENTION

Embodiments of a wagon or a foldable wagon may comprise comfort and convenience features for carrying children and/or other articles. The comfort features may include at least a canopy to provide shade and protection from the rain for the occupants of the wagon. Embodiments of wagons for carrying children may comprise a wagon assembly and a canopy assembly. The wagon assembly and the canopy assembly may be constructed integral with each other, be permanently connected, or removably connected. The wagon assembly may comprise a frame, wherein the frame may be a rigid frame (not foldable from an in-sue configuration to a storage configuration, for example) or foldable frame. For example, the foldable wagon may comprise scissoring side frames that may be expanded to convert the wagon to an in-use configuration and be compressed to convert the wagon to a storage configuration or other folding mechanism. Other wagons incorporating a folding canopy assembly may have a rigid, non-folding structure.

An embodiment of the wagon for transporting children, as shown in FIGS. 1, 1A, 1B, 1C and 1D, comprises a wagon assembly and a canopy assembly connected to the wagon assembly. In this embodiment, the canopy assembly comprises a canopy frame and a canopy. The canopy is supported over the cargo area or child seating area by the canopy frame. The canopy may be of any flexible material such as, but not limited to, plastic or fabric. In one embodiment, the canopy assembly comprises a first canopy support frame, a second canopy support frame, and a canopy slidably connected to the first canopy support frame and the second canopy support frame. The first and second canopy support frames may comprise a U-shaped portion, however, any shape may be incorporated that supports the canopy at least partially over the cargo area of the wagon.

For example, the first and second canopy support frames may comprise a portion that configures the support frame such that it may rotate from the in-use configuration to the storage configuration without interference with other components of the wagon assembly and/or the canopy assembly. For example, the first and second canopy support frames may comprise an S-shaped portion to extend the canopy support frame outside of the wagon assembly frame and the handle.

The first canopy support frame is connected to the wagon assembly and a second canopy support frame rotatably connected to the wagon assembly. The canopy support frames may be rotated from the in-use configuration to the storage configuration while connected to the wagon assembly. The term "rotatably connected" as used herein means that the first component is connected to the second component and at least a portion of the first component is configured to rotate relative to the second component. The connection between the two components does not have to incorporate the rotation mechanism and they may be integrated or separate components as shown in the figures. In some embodiments, the canopy assembly may comprise rotatable joints in the canopy support frames and in other embodiments, the wagon assembly may comprise rotatable joints.

In an embodiment, a canopy may be slidably connected to the first canopy support frame and the second canopy support frame. For example, the canopy may define a first sleeve and a second sleeve to slidably connect the canopy to the first canopy support frame and the second canopy support frame. In such an embodiment, the first canopy support frame is received within the first sleeve and the second canopy support frame is received within the second sleeve. In this configuration, the canopy may be adjusted on the first support frame from an in-use configuration (See FIG. 1A) to a side rotation configuration (See FIG. 1B).

Another embodiment includes a method of folding a wagon. Embodiments of the method comprise sliding the canopy on a from a top in-use configuration to a side rotation configuration on a first canopy support frame sliding the canopy from the top in-use configuration to the side rotation configuration on a second canopy support frame. The method may further comprise rotating the first canopy support frame from a first in-use configuration to a first storage configuration and/or rotating the second canopy support frame from a second in-use configuration to a second storage configuration in the direction R shown in FIG. 1B. Rotating the first canopy support frame and rotating the second canopy support frame may result in the canopy moving from the side rotation configuration (See FIG. 1B) to a storage or wagon folding configuration (See FIG. 1D.

The wagon frame may further comprise upper accessory connectors 34 for removably connecting the canopy assembly. The upper accessory connectors may be on top of corner wagon support posts, on the top of the scissor frame end frames, or other appropriate portions of the frame, for example. The accessory connectors 34 may be used to connect individual sunshades to one or both ends of the wagon or to connect one canopy across the cargo area of the wagon to provide protection from sun, rain, and/or wind to a child in the wagon. In embodiments with four accessory connectors (one at each corner of the wagon frame, for example), the canopy assembly may comprise four connectors 34 capable of connecting to the accessory connectors to provide protection to the substantially the entire cargo inner volume. The canopy frame members may be connected to the accessory connectors, for example (See FIG. 2). Alternatively, other accessories may be attached. The accessories may include, but are not limited to, a food/drink cooler, a table surface, drink holders, umbrella holder, adult seat, cell phone holder, combinations thereof, or other desired accessories.

Aspects of the stroller are presented in various embodiments, however one skilled in the art will understand various variation and interchangeability of the components of the various embodiments which are intended to be included in the scope of the invention.

BRIEF DESCRIPTION OF THE FIGURES

FIG. 1A depicts the canopy assembly in the in-use configuration, FIG. 1B depicts the canopy assembly in the side rotation configuration, FIG. 1C depicts the canopy assembly with one canopy support frame rotated to the storage configuration and the other canopy support frame in the in-use configuration, and FIG. 1D depicts the canopy assembly in the storage configuration;

DETAILED DESCRIPTION

Embodiments of a wagon for carrying children or other articles comprise a wagon assembly and a canopy assembly. The wagon assembly may comprise a folding frame or a rigid frame with components mounted and supported on the folding frame or rigid frame on accessory connectors. A cover, for example, a fabric cover, may be attached to the folding frame using conventional techniques in the art such as making a sleeve to receive the frame components, use of grommets, hook and loop connectors, stitching, other connectors, or combinations thereof.

Embodiments of the wagon or a foldable wagon for carrying children or other articles may comprise comfort and convenience features. The comfort features may include a canopy for providing shade and protection from the rain or snow for the occupants or articles in the wagon, for example. The canopy may be a component of a canopy assembly.

In further embodiments, the wagon may comprise the wagon assembly and a folding canopy assembly configured to rotate from an in-use configuration to a storage configuration. The canopy assembly may be removable from the wagon assembly or more permanently connected such as by formed integrally with the wagon assembly or connected with rivets, bolts, adhesives, or other connection that may not be readily removed without special skills or tools, for example. One skilled in the art understands the difference between a user removable component and a component that is intended to remain permanently connected during normal and life of the device.

Figure 1:
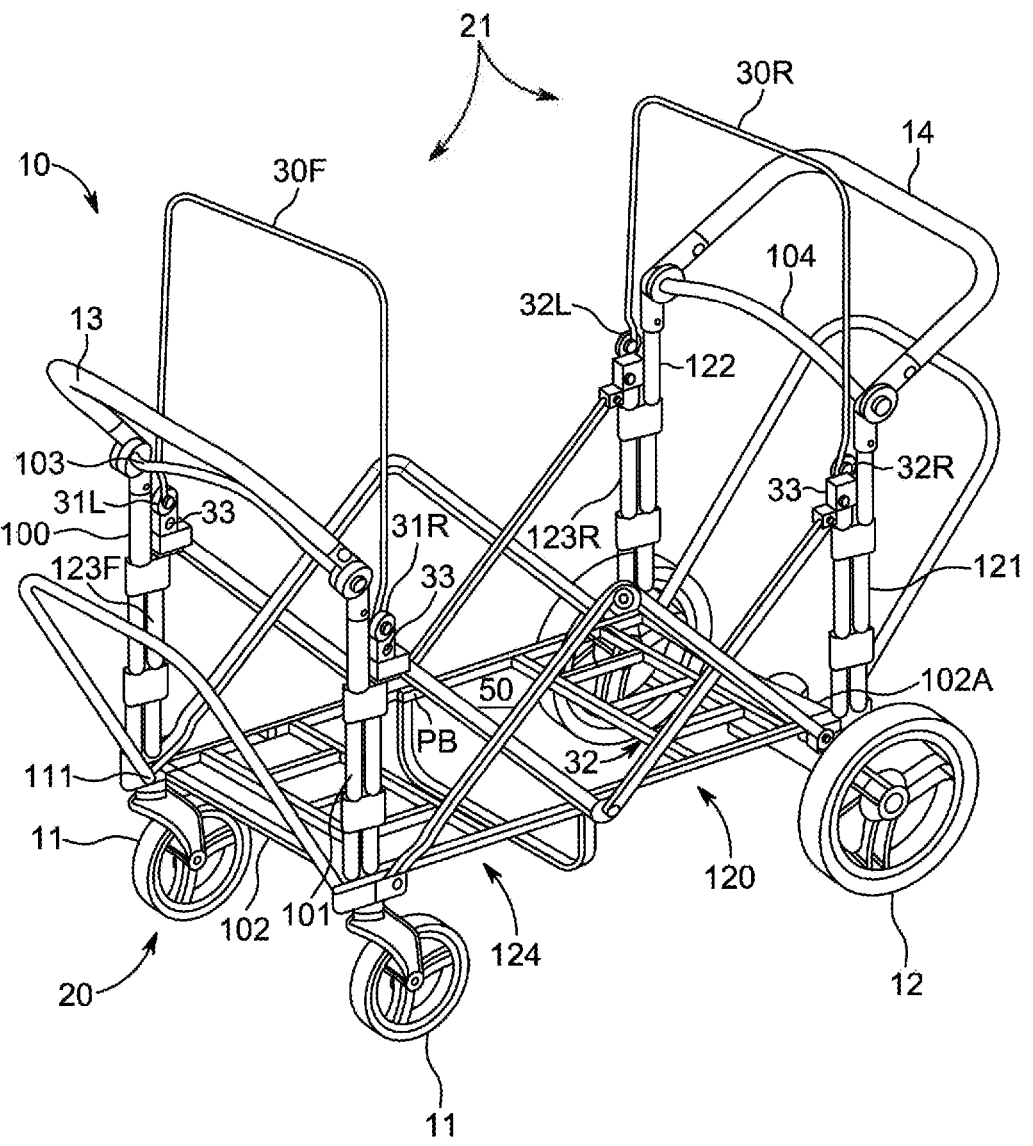
FIG. 1 depicts an embodiment of a wagon comprising a wagon assembly and a canopy assembly.
Figure 1A:
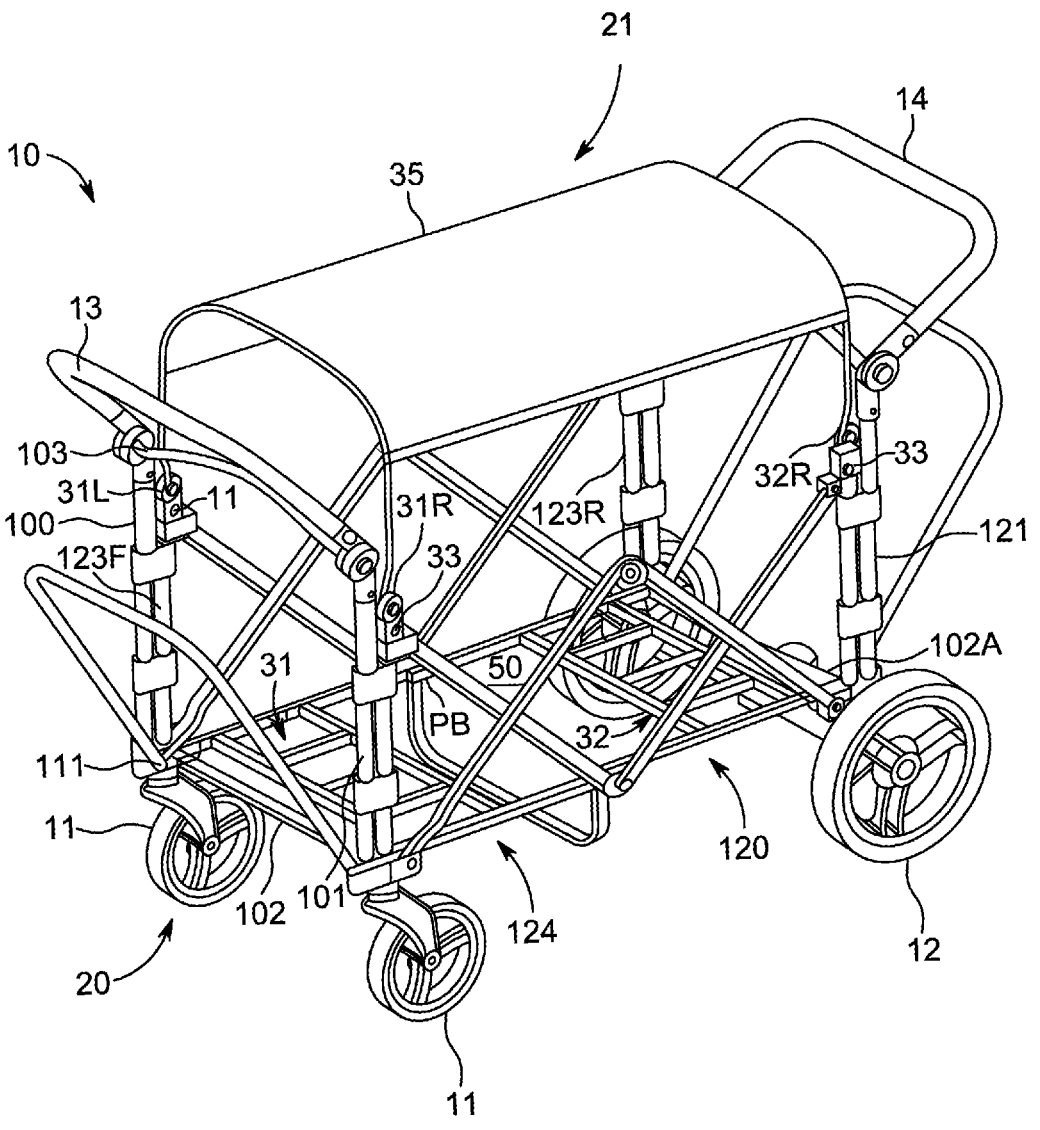
FIGS. 1A, 1B, 1C, and 1D depict the embodiment of the wagon of FIG. 1 with the canopy assembly in various stages of being folded.

In the embodiment shown in FIG. 1, the wagon for transporting children comprises a wagon assembly and a foldable and removable canopy assembly. In FIG. 1, the canopy is not shown connected to the canopy assembly fin this figure for clarity but is shown in FIGS. 1A through 1D. In FIG. 1A, the canopy assembly is shown comprising the canopy in its in-use configuration.

Referring back to FIG. 1, the canopy assembly comprises a first or front canopy support frame 30F connected to the wagon assembly 20 and a second or rear canopy support frame 30R also connected to the wagon assembly 20. In this embodiment, first canopy support frame 30F is removably connected to the wagon assembly 20 at the accessory connectors 34 of the wagon assembly 20 by removable connectors 33 on the lower ends of the first support frame 30F. The first canopy support frame 30F comprises the removable connectors 33 for reversibly connecting the first canopy support frame 30F to the wagon assembly and pivot joints 31L and 31R configured to pivoting the canopy frame 30 (See FIG. 3) relative to at least one of the removable connector 33 or the wagon assembly 20. Any pivot joint that is configured to reversibly retain the canopy frame in the desired in-use configuration and allow rotation of the canopy frame 30 to the storage configuration may be used. Similarly, any connector 33 permanent or removable may be used to connect the canopy assembly to the wagon assembly 20.

A first pivot joint or a first rotating mechanism 31 may comprise a locking or retaining mechanism configured to lock or otherwise retain the first canopy support frame in a substantially vertical position and a second pivot joint or a second § rotating mechanism 31 may comprise a locking or retaining mechanism configured to lock or otherwise retain the first canopy support frame in a substantially vertical position.

Figure 2:
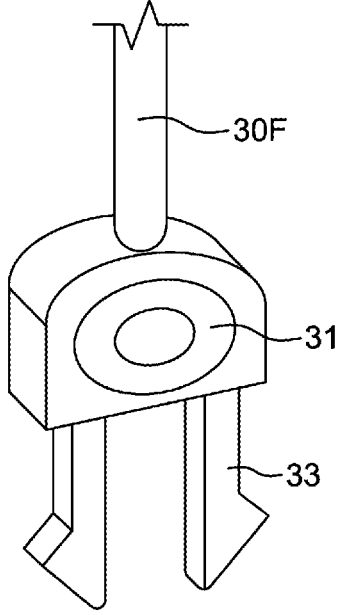
FIG. 2 depicts an embodiment of a reversible connector that may be used to removably connect the canopy assembly to the wagon assembly and an embodiment of a pivot joint.
Figure 2:
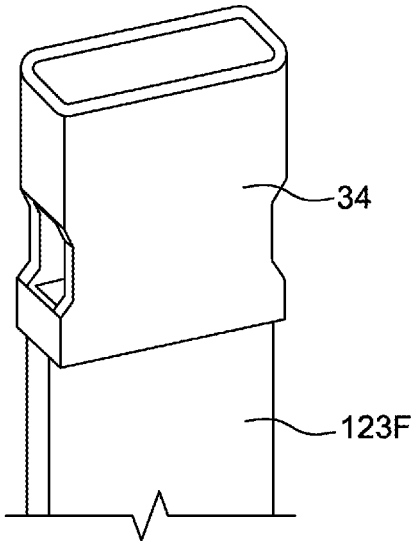

In this embodiment, the second canopy support frame 30R is also removably connected to the wagon assembly 20 at the accessory connectors 34 of the wagon assembly 20 by removable connectors 33 on the lower ends of the first support frame 30R. The second canopy support frame 30R comprises the removable connectors 33 for reversibly connecting the second canopy support frame 30R to the wagon assembly and pivot joints 32L and 32R configured to pivoting the canopy frame 30 (See FIGS. 2 and 3) relative to at least one of the removable connector 33 or the wagon assembly 20. As with the first canopy support frame, any pivot joint that is configured to reversibly retain the canopy frame in the desired in-use configuration and allow rotation of the canopy frame 30 to the storage configuration may be used. Similarly, any connector 33 permanent or removable may be incorporated to connect the second canopy support frame 30R to the wagon assembly 20. An embodiment of the removable connectors 33 are shown in FIG. 2.

FIG. 1A shows the canopy slidably connected to each of the first canopy support frame and second canopy support frame. The canopy 35 may be slid from the in-use configuration to the side rotation (see FIG. 1B) along the canopy support frames. In this embodiment, the canopy 35 comprises a sleeve 36 configured to receive either of the canopy support frames within the sleeve (second canopy support frame 30R is shown received within the sleeve 30 in FIG. 1E).

Figure 1B:
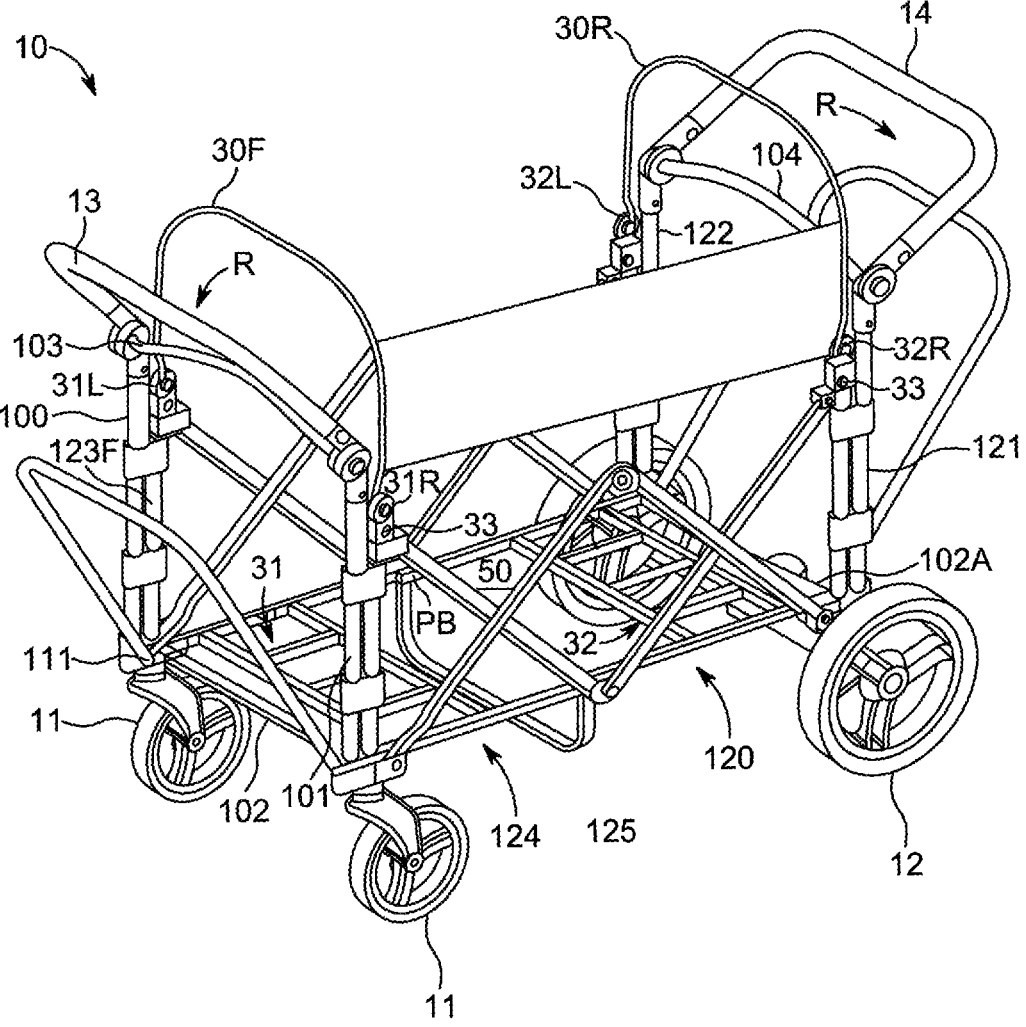

In FIG. 1B, the canopy is shown in the canopy side rotation configuration. In the side rotation configuration, the canopy is slid from being substantially on the top 30T in the in-use configuration of the canopy support frame 30 (See FIG. 3) to residing substantially on the side 305 of the canopy support frame. The canopy may be slid to either side of the canopy support frames.

Figure 1C:
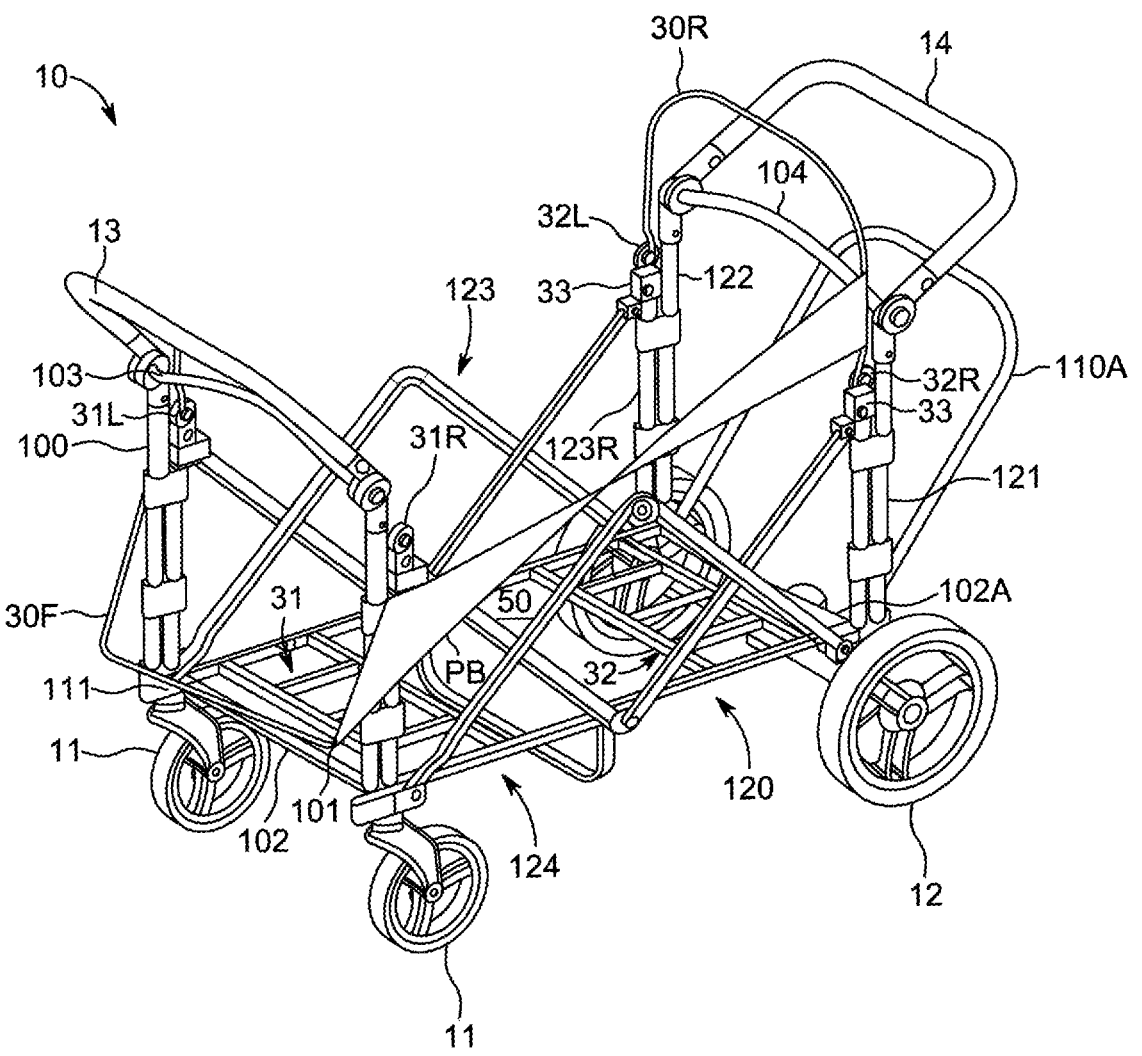
Figure 1D:
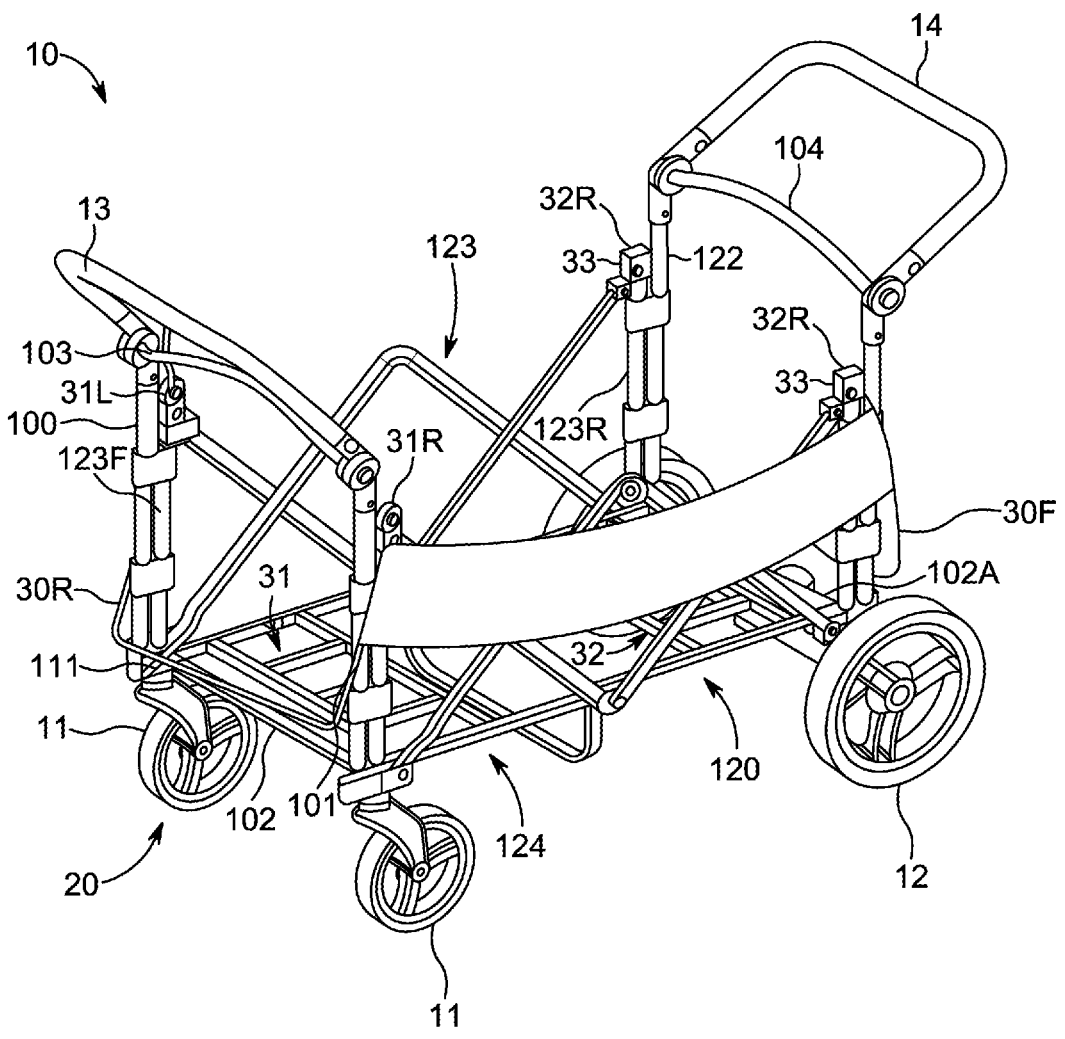
Figure 1E:
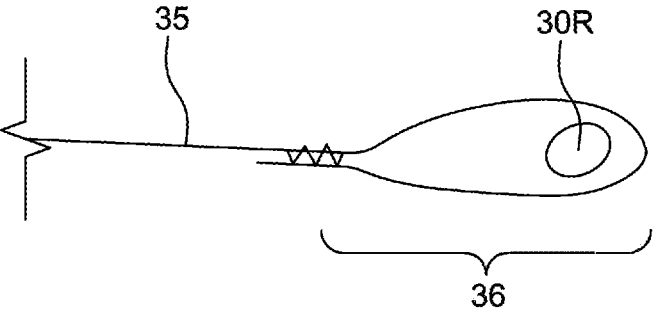
FIG. 1E depicts an embodiment of a sleeve configured to receive either of the canopy support frames.

The embodiment shown in FIG. 1 and FIGS. 1A through 1D demonstrate the rotation of at least a portion of the first canopy support frame and at least a portion of the second canopy support frame from the in-use configuration (FIG. 1) to the storage configuration (FIG. 1D). The canopy frame is shown in FIG. 1A with both the first canopy support frames in an in-use configuration and the canopy 35 in an in-use configuration located on the top 30T of the support frames 30.

In the in-use configuration, any occupants of the wagon and/or article in the cargo area are provided with shade and some protection from rain or snow to the occupants or contents of the wagon 10. In the shown in-use configuration, the canopy support frames 30F and 30R are in a substantially vertical position, other in-use configurations are possible. Canopy 35 is shown stretched between the canopy support frames 30F and 30R.

Canopy 35 may be attached to the canopy support frames 30F and 30R by any means that provides a slidable or otherwise moveable connection so the canopy 35 can be moved to various locations on the canopy support frames such as, but not limited to, the in-use configuration and the side rotation configuration. Shown in FIG. 1E, canopy 35 comprises sleeve 36 with a support frame 30R inserted through the sleeve. The canopy may be slidably connected to the support frame by any means such as sleeves (as shown), loops, hook and loop straps, hooks, rings, buttons, or other slidable connection or connector, for example.

The frame support members may be individually, simultaneously, or alternately rotated or folded from a canopy in-use configuration to a canopy storage configuration. In the embodiments shown in FIGS. 1C, 1D, and 4, the first canopy support frame and a second canopy support frame are rotated away from each other or a centerline (lateral centerline) of the wagon. As shown in FIG. 1C, the first canopy support frame 30F has been rotated from the in-use configuration (FIG. 1A and FIG. 1B) to the storage configuration (FIG. 1C and FIG. 1D). Though FIG. 1C shows the first canopy support frame 30F, the second canopy support frame 30R may be rotated first.

Rotation of either of the first canopy support frame 30F or the second canopy support frame 30R while the other canopy support frame is in the in-use configuration and the wagon assembly also in the in-use configuration causes the canopy to stretch and twist as shown in FIG. 1C. In some embodiments, the canopy 35 does not stretch sufficiently to rotate the canopy support frame and the canopy may be disconnected from one canopy support frame to allow both canopy support frames to be rotated into the storage configuration. In other embodiments, the wagon assembly may be folded towards its storage configuration to allow the canopy support frames to be rotated without stretching the canopy.

Figure 5:
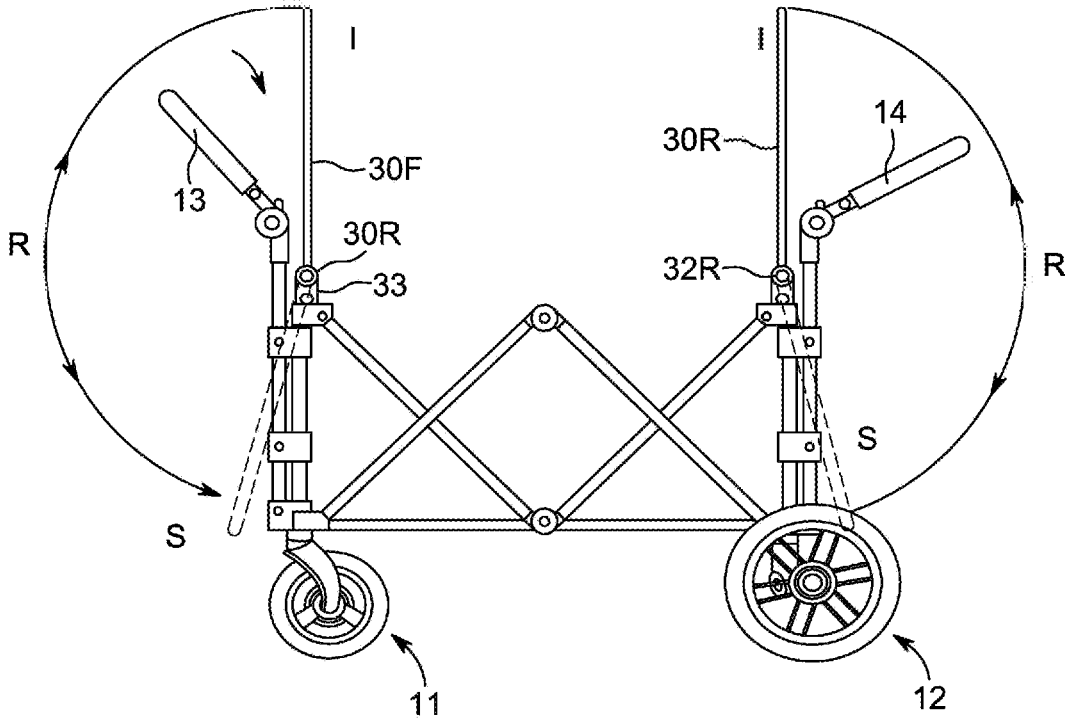
FIG. 5 depicts an elevation view of an embodiment of a wagon assembly and a canopy assembly wherein the canopy support frames are rotated to the storage configuration away from each other and the lateral center line of the wagon.

As shown in the embodiment of FIG. 5, the canopy support frames are rotated away from each other or toward the outside of the cargo area at the front and rear of the wagon assembly. In other words, the two canopy support frames may be rotated away from a centerline (lateral centerline) of the wagon. In other embodiments, the first canopy support frame and a second canopy support frame are rotated toward each other or into the cargo area of the wagon or toward the centerline (lateral centerline) of the wagon. In another embodiment, the canopy support frames may be linked together, such as mechanically linked together to rotate simultaneously.

FIGS. 1A through 1D depict the method of folding the canopy 35 from the in-use configuration (FIG. 1A) to the storage configuration (FIG. 1D) with two intermediate positions including the canopy side rotation configuration (FIG. 1B) and the canopy twisting configuration (FIG. 1C). In still another embodiments, the first canopy support frame and a second canopy support frame are rotated toward or away each other toward the longitudinal centerline of the wagon.

As such, an embodiment a method of folding the canopy comprises sliding the canopy from a top in-use configuration to a side rotation configuration on a first canopy support frame and sliding the canopy from the top in-use configuration to the side rotation configuration on a second canopy support frame. In this method, the canopy may be moved along the canopy support frames one at a time, alternatingly, or simultaneously, for example. This step may be performed in any way to move the canopy from an in-use configuration to a side rotation configuration. As used herein, the side rotation configuration is not a specific location but any position that allows rotation of the canopy support frames from their in-use configuration to their storage configuration without damaging the canopy support frames or the canopy.

Figure 3:
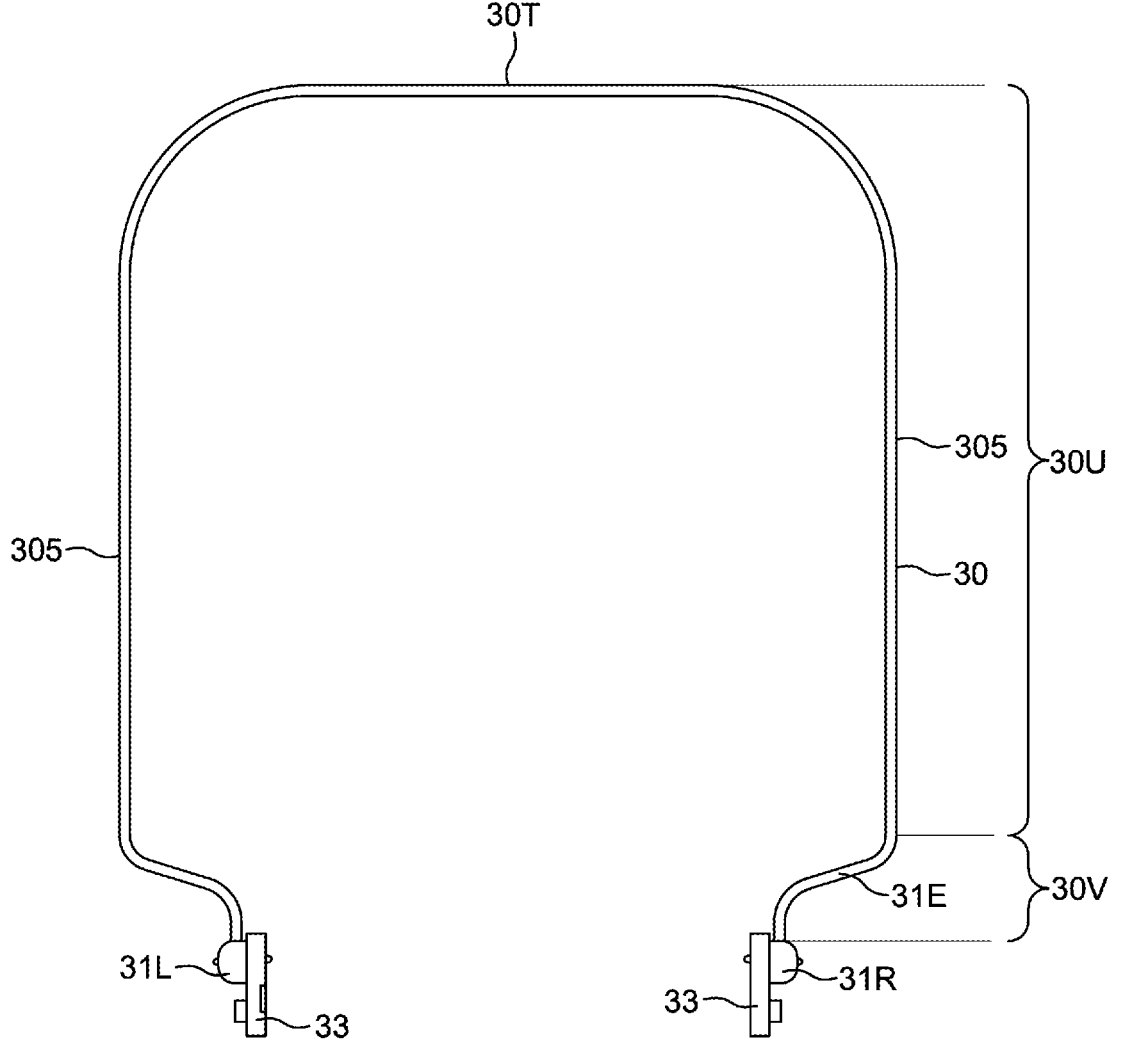
FIG. 3 depicts an embodiment of a canopy support frame with and S-shaped width extending portion.
Figure 4:
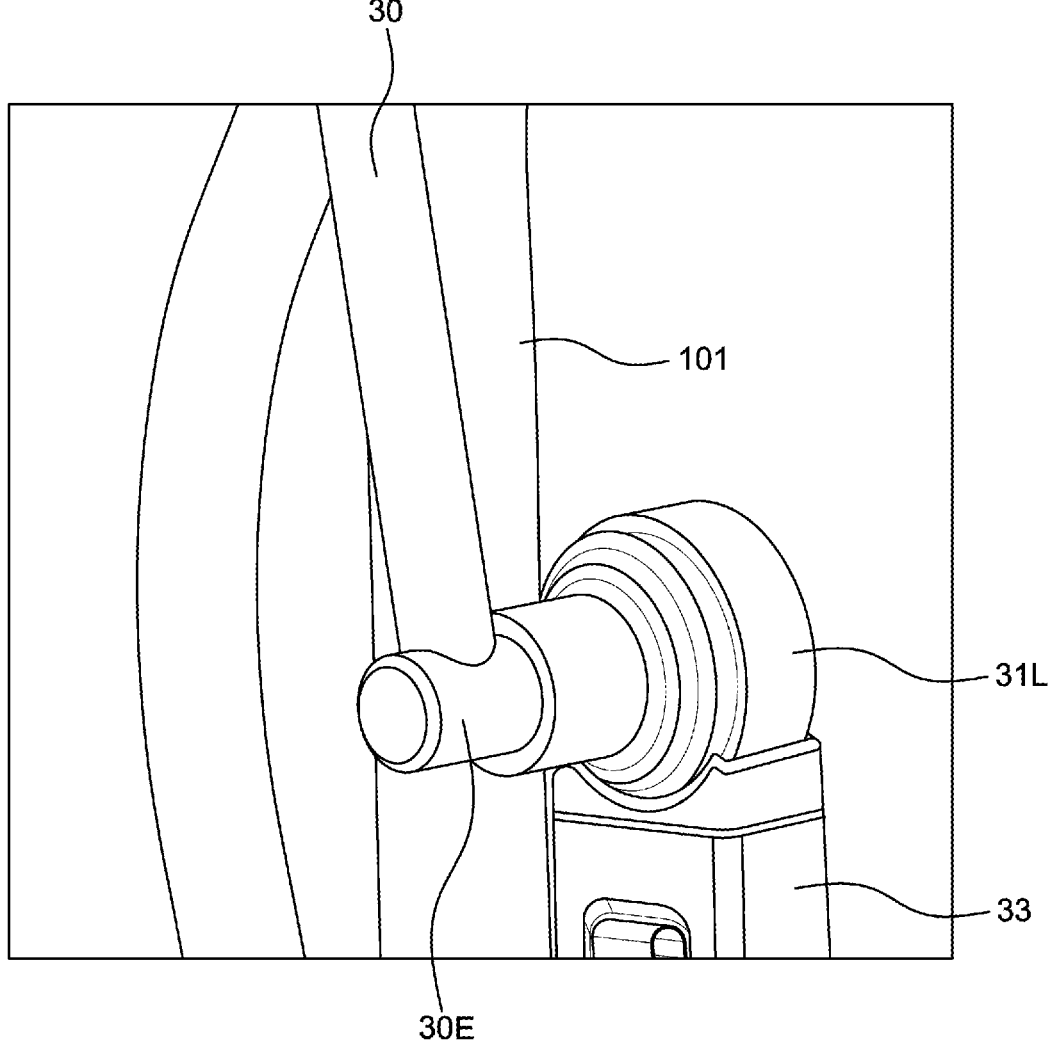
FIG. 4 depicts another embodiment of a canopy support frame with an L-shaped width extending portion.

As shown in FIG. 3, an embodiment of the canopy support frame 30U has a U-shaped configuration. Other shapes may be used for aesthetic or functional purposes. In some embodiments, a simple U-shaped configuration will not define an inner gap space sufficiently wide on the canopy support frame to provide interference free rotation from the in-use configuration to the storage configuration. In such embodiments, the canopy support frame may comprise a width extending portion. The width extending portion 30V depicted in FIG. 3 is an S-shaped portion 31E and the width extending portion shown in FIG. 4 is an angled shaped portion or L-shaped portion. The width extending portion may be other shapes or designs to allow the canopy support frame to properly rotate from the in-use configuration to the storage configuration.

As shown in FIG. 4, the L-shaped width extending portion 30E is connected to the removable connector 33 which extends out beyond the support frame 101 of the wagon assembly 20 to allow the rotation of the canopy support frame without interference with any components of the wagon support frame 20.

Embodiments of wagon assembly comprise a frame, wherein the frame may be a foldable frame or a rigid frame. For example, the foldable wagon with a foldable frame may comprise scissoring side frames that may be expanded to convert the wagon to an in-use configuration and be compressed to convert the wagon to a storage configuration. Other wagons incorporating these features may have a rigid, non-folding structure.

The wagon frame may comprise left and right frames, front and rear frames, and a bottom frame. The left frame and the right frame may be foldable frames such as, but not limited to, scissoring folding frames. Scissoring folding frames allow the side the length or height of the side frame to be reduced as the individual frame member rotate relative to each other.

The wagon may comprise a fabric cover supported over the frame to define the wagon features such as, but not limited to, front wall, rear wall, left wall, right wall, floor, a footwell and/or a reclining seatback or seatbacks of the wagon. The fabric cover over the wagon may comprise several panels that cover the frame and define a cargo volume or bed in the wagon.

An embodiment of wagon assembly 20 for a wagon for transporting children is shown in FIG. 1. The wagon assembly 20 comprises a wagon assembly 20 and a canopy assembly 21 (canopy not shown in FIG. 1, shown in FIGS. 1A through 1D) a top frame 12 and a bottom frame 124. With the folding wagon 10, as seen in FIG. 1, the wagon assembly comprises front wheels 11 that are spaced apart from the rear wheels 12 with the wagon is in an in-use configuration. The in-use configuration is shown in FIG. 1A. In storage configuration, the front wheels 11 and the rear wheels 12 may be adjacent to each other, as the side frames 125 and 123 are contracted to that position.

In one embodiment, the folding wagon 10 has a wagon assembly 20 that may be converted from an in-use configuration (shown in FIG. 1) to a storage configuration. In the embodiment shown in FIG. 1 (and other figures), wagon assembly 20 comprises a right front support frame 100, a left front support frame 101, a right rear support frame 122, and left rear support frame 121. A front upper horizontal support 103 extends between the right front support frame 100, and the left front support frame 101. Similarly, a rear upper horizontal support 104 extends between the right rear support frame 122 and the left rear support frame 121. The front upper horizontal support 103 or the rear upper horizontal support 104 may be converted into a handle or the wagon 10 may have additional handles, such as front handle 13 and/or rear handle 14. In one embodiment, the front support frames 100 and 101 may be connected by a front lower horizontal support 102 for added support. Similarly, the rear support frames 121 and 122 may be connected by a rear lower horizonal support 102A for the same purpose.

The front handle 13 and/or rear handle 14 may be removably connected to the wagon assembly 20.

In this embodiment, the front right bottom frame bottom connector 111 also connects the right front support frame 120, the right side frame 123, the bottom frame 124, and the left front support frame 101. The right side frame 123 comprises a front telescoping post 123F and a rear telescoping post 123R. Each telescoping post comprises a hollow vertical support and the telescopic extensions within the hollow vertical supports. The vertical supports may be made of metal tubing having a circular, square, rectangular or other appropriate shaped cross-section. The vertical supports may additionally have a telescopic bushing, which is an insert, preferably made of plastic, which generally permits the telescoping movement when the front telescopic post 123F and the rear telescoping post 123R are moved toward each other during the folding of the wagon. The side frames 123 and 125 may be scissor frames to allow folding, when the telescoping posts 123F and 123R are biased toward one another, the telescoping posts must extend by sliding the telescopic extension out of the hollow vertical support.

The bottom frame comprises two hingedly connected bottom frame sections, a front bottom frame 124 and a rear bottom frame 120. The front bottom frame 124 and the rear bottom frame 120 are hingedly connected at a bottom frame pivot axis PB. The front bottom frame 124 comprises a front seat support frame 31. The rear bottom frame 120 comprises a rear seat support frame 32. The seat support frames may comprise one or more frame members or the seat support frames may comprise a panel for supporting the child.

FIG. 3 shows an embodiment of a connector for removably connecting the canopy assembly to the wagon assembly. Other removable or permanent connectors may be used including friction fittings, pins and apertures, or other clips, for example.

The embodiments of the described methods and the wagon are not limited to the embodiments, components, method steps, and materials disclosed herein as such components, process steps, and materials may vary. Moreover, the terminology employed herein is used to describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be affected within the scope of the invention as defined in the appended claims. Accordingly, the scope of the various embodiments of the present invention should not be limited to the above discussed embodiments and should only be defined by the following claims and all equivalents.

The invention claimed is:

1. A wagon for transporting children, comprising:
   a wagon assembly; and;
   a canopy assembly, wherein the canopy assembly comprises:
   a first canopy support frame connected to the wagon assembly;
   a second canopy support frame connected to the wagon assembly, wherein at least a portion of the first canopy support frame and at least a portion of the second canopy support frame is rotatable relative to the wagon assembly from an in-use configuration to a storage configuration; and
   a canopy slidably connected to the first canopy support frame and the second canopy support frame, wherein the first canopy support frame is configured to rotate from the in-use configuration above the wagon assembly to the storage configuration outside a cargo area of the wagon assembly.

2. The wagon for transporting children of claim 1, comprising the first canopy support frame comprises a U-shaped portion.

3. The wagon for transporting children of claim 2, wherein the canopy support frame comprises a width extending portion.

4. The wagon for transporting children of claim 1, wherein the canopy assembly comprises a plurality of pivot joints, wherein the pivot joints are configured to allow rotation of a portion of the first canopy support frame and a portion of the second canopy support frame relative to the wagon assembly.

5. The wagon for transporting children of claim 1, wherein the wagon assembly comprises a plurality of pivot joints, wherein the pivot joints are configured to allow rotation of the first canopy support frame and the second canopy support frame relative to the wagon assembly.

6. The wagon for transporting children of claim 1, wherein the canopy comprises a first sleeve and a second sleeve and the first canopy support frame is received within the first sleeve and the second canopy support frame is received within the second sleeve.

7. The wagon for transporting children of claim 1, comprising a first rotating mechanism connected to first canopy support frame and a second rotating mechanism connected to second canopy support frame.

8. The wagon for transporting children of claim 7, wherein the first rotating mechanism is connected to the wagon assembly.

9. The wagon for transporting children of claim 7, wherein the first rotating mechanism is connected to the canopy assembly.

10. A method of folding a canopy on a wagon, comprising
    sliding the canopy on a from a top in-use configuration to a side rotation configuration on a first canopy support frame;

sliding the canopy from the top in-use configuration to the side rotation configuration on a second canopy support frame;
    rotating the first canopy support frame from a first in-use configuration to a first storage configuration; and
    rotating the second canopy support frame from a second in-use configuration to a second storage configuration, wherein the canopy flips over as rotated from the side rotational configuration to the side storage position.

11. The method of claim 10, wherein the first canopy support frame is rotatably connected to a wagon and the second canopy support frame is rotatably connected to the wagon frame.

12. The method of claim 10, wherein rotating the first canopy support frame and rotating the second canopy support frame causes the canopy to move from the side rotation configuration to a storage configuration.

13. The method of claim 10, wherein the canopy stretches during the rotating of the first canopy support frame and/or during the rotating of the second canopy support frame.

* * * * *